July 1, 1930.  F. P. CAUSSE  1,769,768
SENSITIVE WEIGHING AND COUNTING APPARATUS
Filed July 1, 1927  2 Sheets-Sheet 1
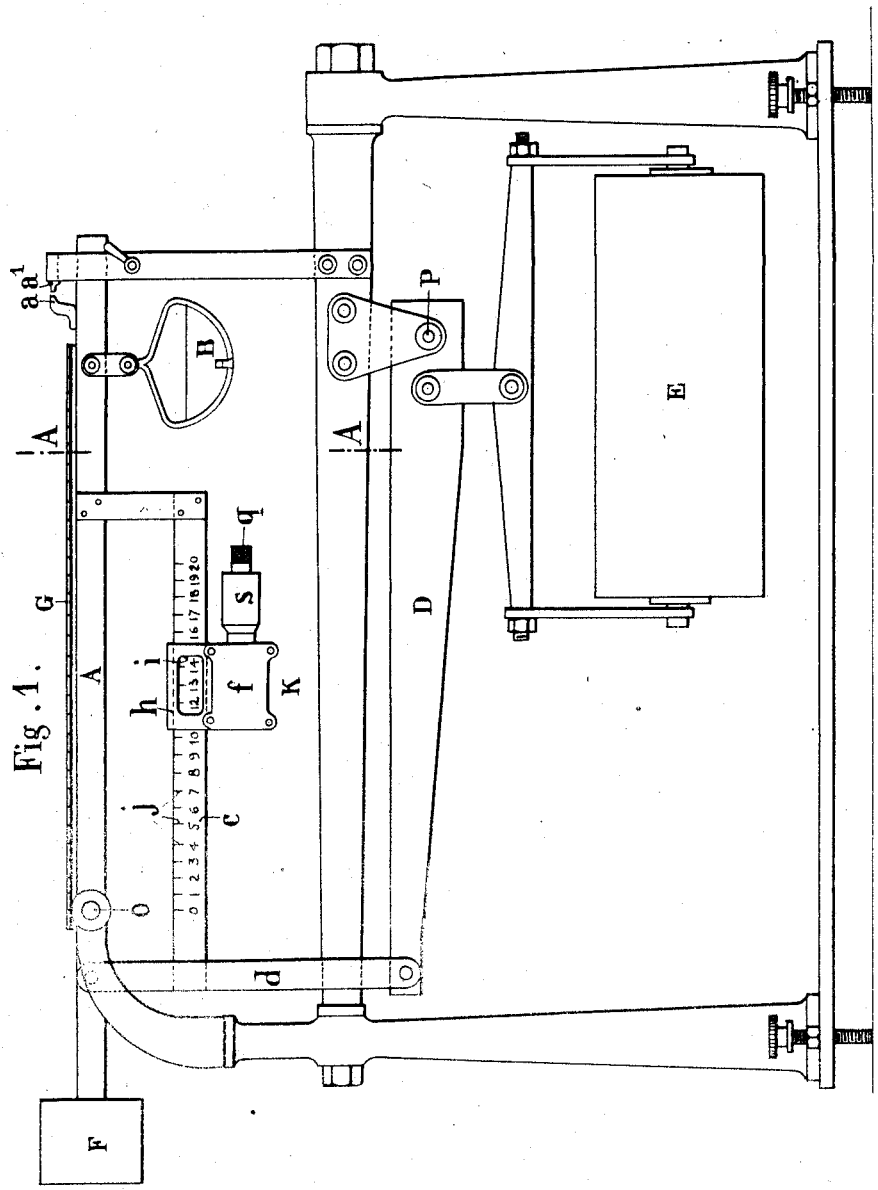
INVENTOR
FERNAND PASCAL CAUSSE
By
ATTORNEY July 1, 1930.  F. P. CAUSSE  1,769,768
SENSITIVE WEIGHING AND COUNTING APPARATUS
Filed July 1, 1927   2 Sheets-Sheet 2
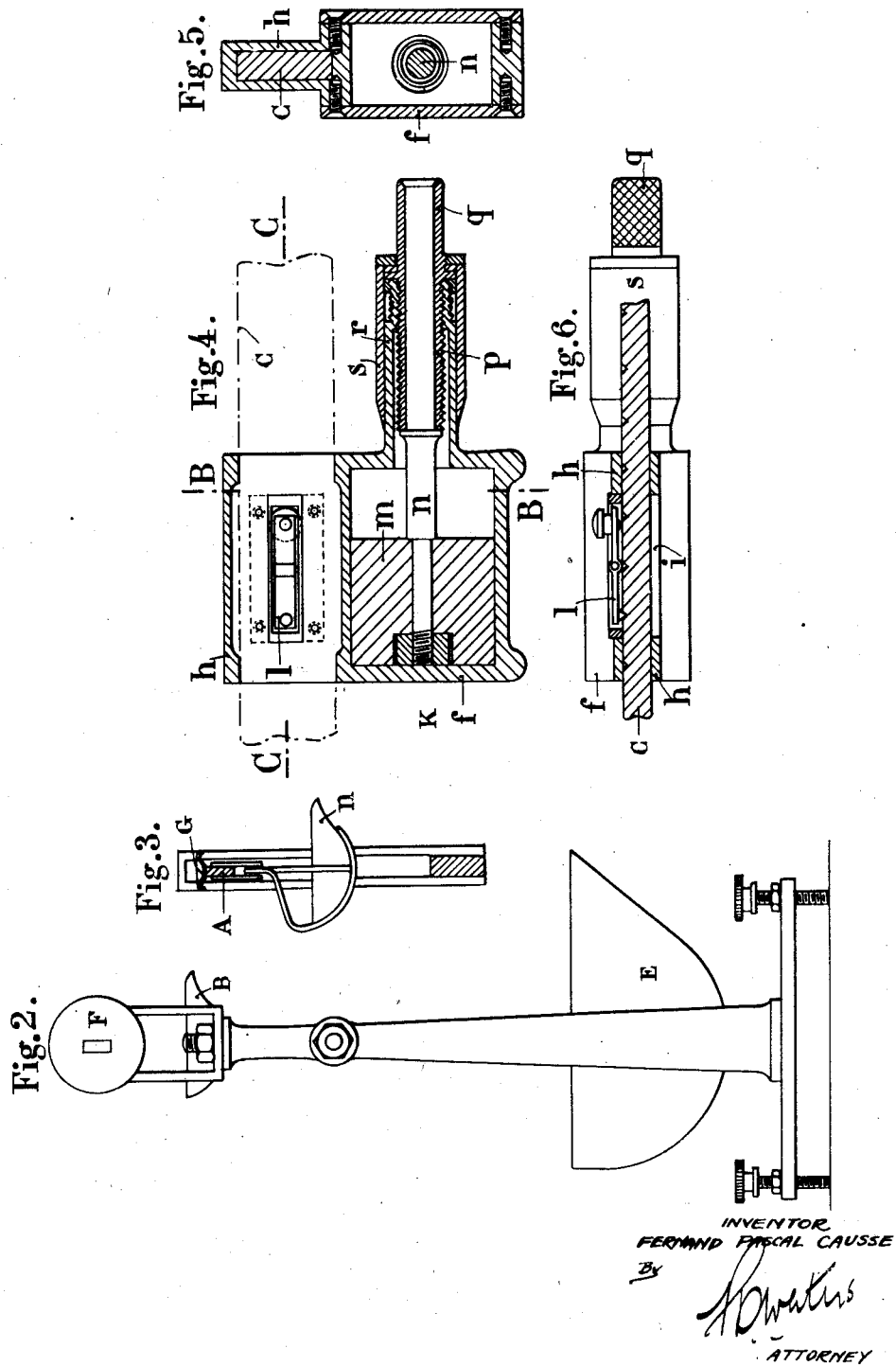
INVENTOR
FERNAND PASCAL CAUSSE
By
ATTORNEY Patented July 1, 1930

1,769,768

UNITED STATES PATENT OFFICE

FERNAND PASCAL CAUSSE, OF GENNEVILLIERS, FRANCE, ASSIGNOR TO SOCIÉTÉ ANONYME LE CARBONE, OF GENNEVILLIERS, SEINE, FRANCE

SENSITIVE WEIGHING AND COUNTING APPARATUS

Application filed July 1, 1927, Serial No. 202,853, and in France March 28, 1927.

Machines adapted to permit of rapidly counting a large number of parts or members already exist.

The principle of these appartus is generally the following: The parts or members to be counted are placed in a large bucket carried by a set of levers, one of which forming a balance beam carries a small bucket in which is placed a known number of parts identical to those to be counted; the small bucket is moved on its beam until the equilibrium is re-established. The number read on the beam gives the factor by which it is necessary to multiply the number of parts or members contained in the small bucket for knowing the number of those contained in the large bucket.

The apparatus devised according to this principle do not give entire satisfaction for the following reasons:

The small bucket is movable and its weight must be constantly balanced, this complicates the mechanism and renders it not very accurate, owing to the numerous movable parts it drives.

Moreover, these balances give the numerical factor by which it is necessary to multiply the number of parts or members contained in the small bucket for knowing the number of those contained in the large bucket. If very light parts are under consideration, it is necessary to place at lease 100 parts in the small bucket. Now the multiplier is given in units and, at most, the fractions can be appreciated to a $1/4$, this giving a possible error of 25 parts.

Besides, the operation for displacing the rider is long and the utilization of the apparatus is by this fact complicated.

The present invention is adapted to remedy these inconveniences and relates to a combined weighing and counting machine, giving by simple reading, the exact number of the parts and permitting, moreover, to know their weight with the greatest pecision.

The invention is first characterized by the combination with a system of beams carrying the large bucket and the small bucket, of a special counting device, permitting to evaluate the number of parts to a unit. This device substantially consists in a graduated member parallel to the beam carrying the small bucket and rigid with the said beam, one of the members is moved on said graduated member until equilibrium is obtained, the number read on the graduation completing that indicated by the number of parts contained in the small bucket.

In the form of construction preferably adopted, the said graduated member has the shape of a channel member in the bottom of which is traced the graduation.

The invention is characterized on the other hand by a weighing system permitting to measure with precision the weight of a certain quantity of parts. This system comprises a Roman balance beam, graduated for instance in kilograms, on which moves a rider, this rider being provided with a movable body the total displacement of which is equivalent to the displacement of the rider according to a unit of the graduation. The displacement of this body relatively to the rider, measured for instance by the rotation of an operating screw, allows to evaluate the subdivisions of the graduation, that is to say the decigrams, or the grams according to the degree of precision desired.

The invention is illustrated, but by way of example only, in the accompanying drawing in which:

Fig. 1 is an elevation of the entire weighing and counting machine.

Fig. 2 is a corresponding side view.

Fig. 3 is a section made according to line A—A of Fig. 1.

Fig. 4 is a longitudinal vertical section, on an enlarged scale, of the rider.

Figs. 5 and 6 are sections made according to line B—B and C—C of Fig. 4.

As illustrated in the drawing, the new machine comprises a beam A, pivoted at $o$ and carrying the small bucket B. The end of this beam is provided with a point $a$ placed opposite a fixed point $a^1$. With this beam is rigid a graduated bar $c$, forming a Roman balance beam, on which is a rider K to be described later on. The beam A is connected by a link $d$ to a second beam D pivoted at P and carrying the large bucket E.

The lengths of the lever arms are so determined that a load in the small bucket balances a load one hundred times greater in the large bucket.

A counterweight F ensures the balancing of the whole.

Along the beam A is arranged a channel member G in which can be placed one of the parts to be counted or weighed. The bottom or a side of this channel member is graduated. The interval between the verticals of the axis O and of the axis of the small bucket is for instance divided in 100 equal parts.

For counting parts or members, the method of procedure is as follows:

The parts to be counted are placed in the large bucket E, then in the small bucket B is placed a number of parts sufficient for ensuring the equilibrium.

In general, an exact equilibrium is not obtained, which cannot take place, in the example considered, only in the particular case in which the total number of parts would be a multiple of one hundred. It therefore happens that the parts contained in the small bucket do not balance the weight of those of the large bucket, but that, if one part or member more is added, the position of equilibrium is exceeded.

For obtaining the exact equilibrium, the last part or member is not placed in the small bucket, but in the graduated channel member G and it is displaced up to the position in which it ensures the equilibrium of the system. It suffices then to read the division of the graduation of the graduated channel member G where is the center of gravity of the part. The accuracy or precision obtained depends on the appreciation of this division.

It suffices to add the number of parts or members of the small bucket multiplied by 100 and the number read on the graduated channel member for knowing the number of parts or members contained in the large bucket.

In numerous cases, it is necessary, not only to count the parts; but also to weigh them. This weighing operation is obtained by means of the graduated beam C and of its rider K which will now be described.

This rider comprises a body $f$ integral with a fork piece $h$ fitted on the beam C. This fork piece is provided with an opening $i$, Fig. 1, in which appear the graduations $j$. On the opposite side is arranged a spring bolt $l$, provided with a nose entering into notches the spacing apart of which is equal to that of the divisions of the graduation. This arrangement allows to move the rider on the beam from kilogram to kilogram by exactly noting its position without fumbling.

In the body of the rider is provided a movable mass $m$ capable of sliding within this body. It is rigid with a rod $n$ carrying a screw threaded sleeve $p$ exteriorly terminated by a milled portion $q$. This sleeve is screwed in a socket $r$ rigid with the body $f$ and internally screw threaded, serving as a nut for the screw.

The sleeve $p$ carries a sheath $s$ which is integral therewith and moves forward or backward with the said sleeve.

On the socket $r$ is traced a graduation, the divisions of which are for instance spaced apart according to intervals equal to the pitch of the screw, so that when the sheath effects a revolution, it moves forward to the extent of one division. Moreover, the terminal or end section of the sheath $s$ carries a circular graduation. 20 divisions can be adopted for instance on the socket and 50 on the circular graduation, so that with the total displacement of the rider corresponding to 1000 grams it will be possible to measure the weights to 1 gram.

For effecting the weighing operation, the screw of the rider is placed at zero and this rider is moved from kilogram to kilogram on the beam C until the whole number of kilograms contained in the weight to be weighed has been found. Then, for evaluating the grams, the milled portion $q$ is caused to turn until the exact equilibrium is obtained. One then reads on the graduation of the socket $r$ the number of 50 grams, and on the circular graduation of the sheath $s$, the complementary number of grams inferior to 50, forming the total weight.

It is obvious that during this weighing operation the parts or members have been removed from the small bucket, and that the graduated channel member G is empty. Reversely for the counting, the rider must be at zero.

From the foregoing, it will be understood that it is possible to know the number and weight of a quantity of small elements with rapidity and precision without fumbling and without any complicated operation; the new apparatus does not comprise any movable part the balancing of which is difficult to obtain, and in practice, it cannot get out of order. The new apparatus presents therefore important advantages over the previously existing machines.

It is obvious that the realization of the invention can embrace either a simple counting machine without weighing device, or a simple weighing machine without counting device, or the combination of the two systems realizing the combined weighing and counting machine, or finally the application of the special counting device or of the special weighing device to any other measuring apparatus.

The above arrangements are, of course, given by way of example only; the forms, materials and dimension of the constituent parts, as well as the constructional details can vary without departing thereby from the principle of the invention.

I claim:—

1. A weighing and counting machine comprising a system of beams carrying a large bucket for the parts and members to be counted, a small bucket in which are placed identical parts or members, and a graduated channel member connected and parallel to the beam of the small bucket, divisions on said graduated channel being equal in number to the multiplier of said system of beams, said graduated channel being capable of supporting a single part above the corresponding division to place said system in equilibrium, the exact number of parts in said large bucket being the number of parts in said small bucket multiplied by said multiplier plus the number of divisions on said graduated channel bar indicated by said single part.

2. A weighing and counting machine comprising a system of beams carrying a large bucket for the parts and members to be counted, a small bucket in which are placed identical parts or members, and a graduated channel member connected and parallel to the beam of the small bucket and presenting the shape of a channel in which can be moved a member for determining the number of the units.

3. A weighing and counting machine comprising a system of beams carrying a large bucket for the parts and members to be counted, a small bucket in which are placed identical parts or members, a graduated channel member connected and parallel to the beam of the small bucket, a graduated bar connected and parallel to the beam of the small bucket, a rider movable on said graduated bar, and a mass movable in the said rider.

4. A weighing and counting machine comprising a system of beams carrying a large bucket for the parts and members to be counted, a small bucket in which are placed identical parts or members, a graduated channel member connected and parallel to the beam of the small bucket, a graduated bar connected and parallel to the beam of the small bucket, a rider movable on said graduated bar, a mass movable in the said rider, and a screw controlling the displacement of this rider.

5. A weighing and counting machine comprising a system of beams carrying a large bucket for the parts and members to be counted, a small bucket in which are placed identical parts or members, a graduated channel member connected and parallel to the beam of the small bucket, a graduated bar connected and parallel to the beam of the small bucket, a rider movable on said graduated bar, a mass movable in the said rider, a screw rigid with the said mass, a rider for this screw, rigid with the body of the rider, and a sheath accompanying the screw and serving to measure the displacements of the movable mass.

The foregoing specification of my "Sensitive weighing and counting apparatus" signed by me this 15th day of June, 1927.

FERNAND PASCAL CAUSSE.